United States Patent [19]
Kaufmann et al.

[11] Patent Number: 5,633,465
[45] Date of Patent: May 27, 1997

[54] PIRANI PRESSURE SENSOR

[76] Inventors: James Kaufmann, 19845 State Rte. P, Newburg, Mo. 65550; Mary G. Moss, 12901 County Rd. 3000, Rolla, Mo. 65401; Terry L. Brewer, 17971 County Rd. 8440, Rolla, Mo. 65401

[21] Appl. No.: 384,826

[22] Filed: Feb. 7, 1995

[51] Int. Cl.$^6$ .................................................. G01L 21/12
[52] U.S. Cl. ................................................ 73/755; 427/101
[58] Field of Search ................................ 73/755; 427/101

[56] References Cited

U.S. PATENT DOCUMENTS

| | | | |
|---|---|---|---|
| 4,048,349 | 9/1977 | White et al. | 427/101 X |
| 4,682,503 | 7/1987 | Higashi et al. | 73/755 |
| 5,262,195 | 11/1993 | Moss et al. | 427/101 |
| 5,347,869 | 9/1994 | Shie et al. | 73/755 |

Primary Examiner—Elizabeth L. Dougherty
Assistant Examiner—Joseph L. Felber
Attorney, Agent, or Firm—Veo Peoples, Jr.; J. William Stader

[57] ABSTRACT

The invention is a method and apparatus for a pirani pressure sensor. The apparatus consists of a current supply and current receiving means affixed to a substrate. Bridging the current supply means and current receiving means is an electrically conductive polymer. The pirani pressure sensor may be made using conventional photolithographic techniques.

3 Claims, 2 Drawing Sheets

PIRANI PRESSURE SENSOR

The United States Government has a paid-up license in this invention and the right in limited circumstances to require the patent owner to license others on reasonable terms as provided for by the terms of grant number III-9362010, awarded by the National Science Foundation, and contract number DAAL03-92-C-0023, awarded by the Ballistic Missile Defense Organization.

BACKGROUND OF INVENTION

1. Field of the Invention

This invention relates to the field of pressure sensing gauges and methods of manufacturing said gauges.

2. Description of Prior Art

There are a variety of sensors used to measure pressures in a vacuum in the range of $10^{-3}$ torr to atmospheric pressure (760 torr). Currently the prior art reveals four general types of gauges to measure these pressures. These gauges are thermocouples, ionization gauges, oscillating circuits, and finally pirani gauges. Previous disclosures indicate that there are certain disadvantages associated with the use of each of these various measurement devices.

The use of a thermocouple involves using an electrical current to heat a portion of the device and measuring the resulting temperature of the heated portion by monitoring fluctuations in the electrical voltage of a thermocouple element. As the pressure falls, the rate of cooling of the heated portion by the ambient gas decreases. As a result, either the temperature of the heated portion rises or the electrical current needed to keep the heated portion at constant temperature decreases. The disadvantage of the thermocouple measuring system is the necessity that the heating element and measuring element are separate elements and require separate electrical connections. This increases the size and complexity of this pressure measuring system.

An oscillating circuit usually consists of a quartz resonator and a heating source. The resonator undergoes oscillation depending on its temperature. As the gas pressure decreases, the heat reaching the resonator from the heating source decreases. This results in the resonator changing oscillation. Again, this approach to pressure measurement involves a variety of separate devices and connections.

The ionization gauge involves a heated filament that emits electrons which ionizes gas molecules. The ions are then captured in an ion collector. As the gas pressure decreases, the amount of gas molecules available to be ionized decreases. This ultimately results in less ions to be received by the ion collector. The ionization gauge is large and also requires several devices and electrical connections and is primarily effective only at low pressures ($<10^{-3}$ torr) as they will burn out at atmospheric pressures.

The final method is the pirani gauge which is similar to the thermocouple except that the heating element and temperature element are combined into a single wire, thus eliminating multiple devices and electrical connections. In a pirani gauge, the wire is heated and the resistance of the wire is monitored. As the pressure decreases, less heat is transferred from the wire to the surrounding gas. This results in an increased filament temperature which increases the resistivity of the wire. While a pirani gauge eliminates the multiple elements and associate wiring, there are drawbacks to existing pirani vacuum gauges. Specifically, most pirani gauges are large in size, usually much greater than 100 microns. Additionally, pirani gauges are very difficult to manufacture because of the thin wires and connections which need to be made. Finally, pirani gauges measure the resistance change in a metal wire as its temperature changes. Metals have a very small positive temperature coefficient of resistance (TCR). That is, their resistance increases a little bit with an increase in temperature. This coupled with their low resistance makes conventional pirani gauges difficult to measure and relatively insensitive.

There have been attempts to improve pirani pressure gauge technology, but these have met with limited success. A. W. van Herwaarden and P. M. Sarro described an "Integrated thermal vacuum sensor with extended range" in *Vacuum*, volume 38, number 6, pages 449 to 453, 1988. This device was created using an etching procedure which was also used in the manufacture of integrated-circuit technology. However, the size of the sensor is still very large.

Another attempt to improve pirani vacuum gauges was discussed in "Micro-Pirani vacuum gauge" in the February 1994 issue of *Review of Scientific Instruments*. Ping Kuo Weng and Jin-Shown Shie fabricated a pirani sensor by silicon micromachining techniques. However, the size of this device is still large and is difficult to manufacture. Weng and Shie use expensive platinum films as their sensing element; these films have a typical resistance of 450 ohms and a TCR of 0.25%/° C. A further disadvantage of the Weng and Shie gauge is the complex processing involved. The platinum must be passivated and the silicon etched with hydrazine solution at 100° C. Furthermore, the process involves at least four or five masking steps.

Deifenderfer (in *Principles of Electronic Instrumentation*, 2nd ed., Saunders College Publishing Philadelphia, 1978, p. 64–65) describes the operation of a pirani vacuum gauge. His description claims their accuracy is only "2–3 percent, and the resistance changes are seldom more that 10 percent." The resistance of pirani gages are typically in the ohms or tens of ohms so that multiple wire (e.g. Wheatstone Bridge) type measurements are absolutely necessary. For higher accuracy, measurements of the temperature compensation is also necessary, typically utilizing a "dummy" gauge wire.

OBJECTS OF THE INVENTION

It is an object of the present invention to provide a small pirani pressure gauge, approximately 50 microns square.

It is a further object of the present invention to provide a pirani pressure gauge which takes up as little space as possible.

It is a further object of the present invention to provide a pirani pressure gauge with improved resistance-temperature response.

It is a further object of the present invention to provide a method of manufacturing pirani pressure gauges using photolithography technology.

SUMMARY OF THE INVENTION

The present invention is an apparatus and method which overcomes the deficiencies in the prior art. The device is smaller and more sensitive than prior art devices.

The present apparatus consists of a current supply path and a current receiving path affixed to a non-conductive substrate. Bridging the paths is an electrically conductive polymer referred to as the sensor-heater bridge. The polymer is either an ion implanted polymer or a solvent soluble polyaniline conducting polymer.

The method of creating the apparatus involves the use of conventional photolithographic methods.

DETAILED DESCRIPTION OF THE INVENTION

Figure 1:
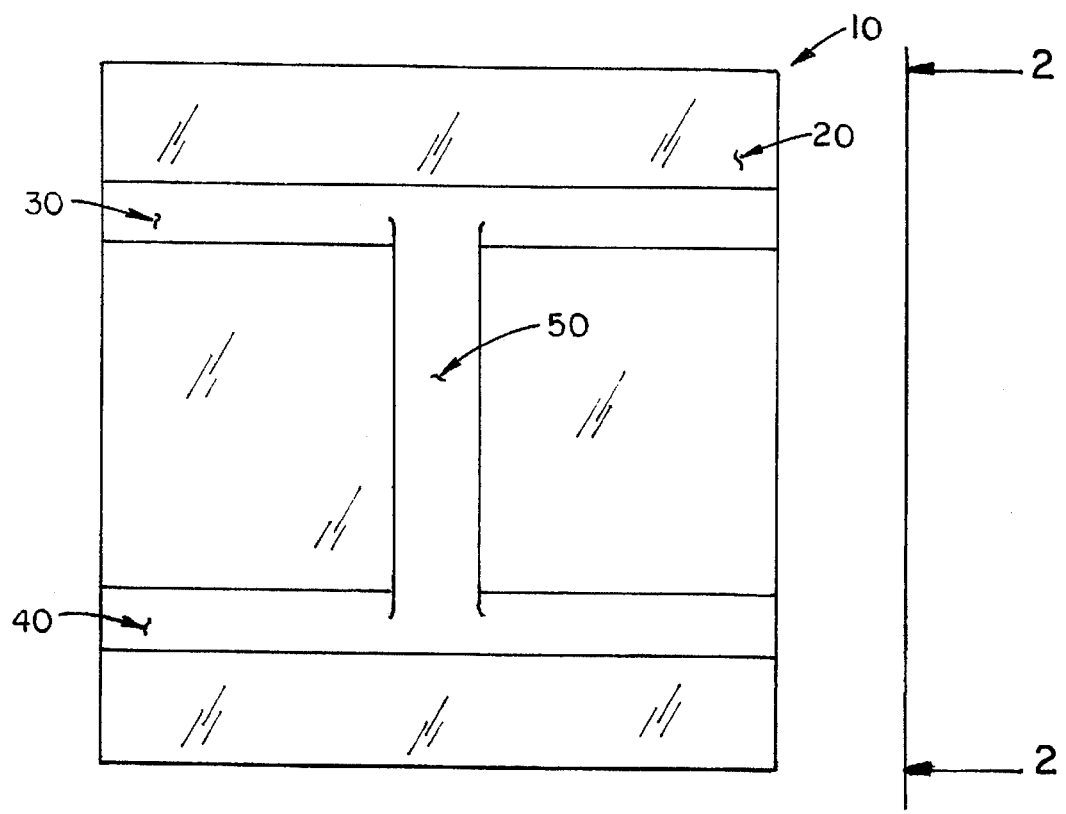
FIG. 1 illustrates an overhead view of a single pirani pressure sensor of the present invention.
Figure 2:
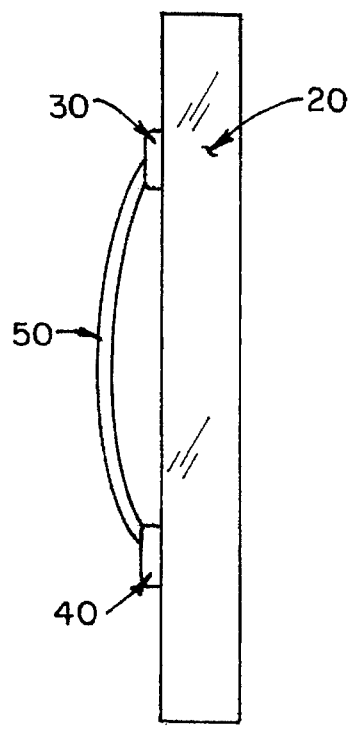
FIG. 2 illustrates a side view of a single pirani pressure sensor of the present invention.

Referring to FIG. 1, it is possible to view the various major elements constituting the present invention (10). The present invention has four major elements. These elements are the substrate (20), the current supply means (30), the current receiving means (40) and the sensor-heater bridge (50).

The substrate (20) is an electrically non-conductive material such as glass. However, any electrically non-conductive material may be used. Any substrate which can support a uniform high quality film could be used for the manufacture of the polymer based gauges. For example, the gauges could be made on aluminum oxide, quartz, a variety of polymers, or even conductive substrates, such as metals, which have an insulating layer deposited on them. This freedom and flexibility allows the ability to choose a substrate which has a low thermal conductivity which would result in better gauge response. This is in sharp contrast to the prior art. The substrate needed for existing prior art gauges is limited to substrates which act as a heat sink.

The current supply means (30) is an electrically conductive pathway such as gold. A variety of conductive materials may be used, such as metals, highly conductive polymers, highly doped semiconductors, or any method of forming electrical interconnects or pathways which would be familiar to one skilled in the art. Similar to current supply means (30) is the current receiving means (40). The current receiving means is also an electrically conductive pathway such as gold. The current supply means (30) and current receiving means (40) are electrically isolated from each other.

Connecting the supply and receiving means is the sensor-heater bridge (50). This element is connected to the current supply means (30) and 'bridges' over the substrate (20) to connect with the current receiving means (40). It is desirable for the bridge to avoid contact with the substrate so as to increase the measuring of heat loss. The sensor-heater bridge of the present invention is a polymer which has been made electrically conductive. There can be two general groups of such polymers. First, is a solvent soluble polyaniline conducting polymers such as generally described in U.S. Pat. No. 5,262,195. They comprise short alkoxy chain substituted polyanilines doped with large organic counterions. The second group comprises ion-implanted polymers. The polymers for implantation can be copolymers of styrene with nitrile-containing acrylic polymers such as polyacrylonitrile or polymethacrylonitrile. Other polymers which can be conveyed in an organic solvent or water can be used. They include soluble acrylic polymers, polyethers, polymides and polyimides and their precursors, polyesters, polyurethanes, polysulfones, polybenzocyclobutanes, phenolformaldehyde resins, or soluble versions of polyaniline or other intrinsically conductive polymers. While the term polymer is used throughout, it is understood that oligomers, thermosetting polymer precursors, or other organic compounds which can form a continuous, high quality film on a substrate, or those materials which can form free-standing films, can be employed. Implantation is conducted using positive ions (preferably nitrogen, but other ions can be used). The conductivity of the implanted polymer is a strong function of the fluence, the ion energy, the polymer type, and polymer thickness. Using 50 keV ions, fluences greater than $1 \times 10^{15}$ ions/cm$^2$ can be used, with the preferred fluence being greater that $1 \times 10^{16}$ ions/cm$^2$. Beam current density can range from 0.1 microamps/cm$^2$, but it is preferable to keep current density low. Ion energy can range from 25 keV to 20 MeV, with the preferred range from 35–100 keV.

Figure 3:
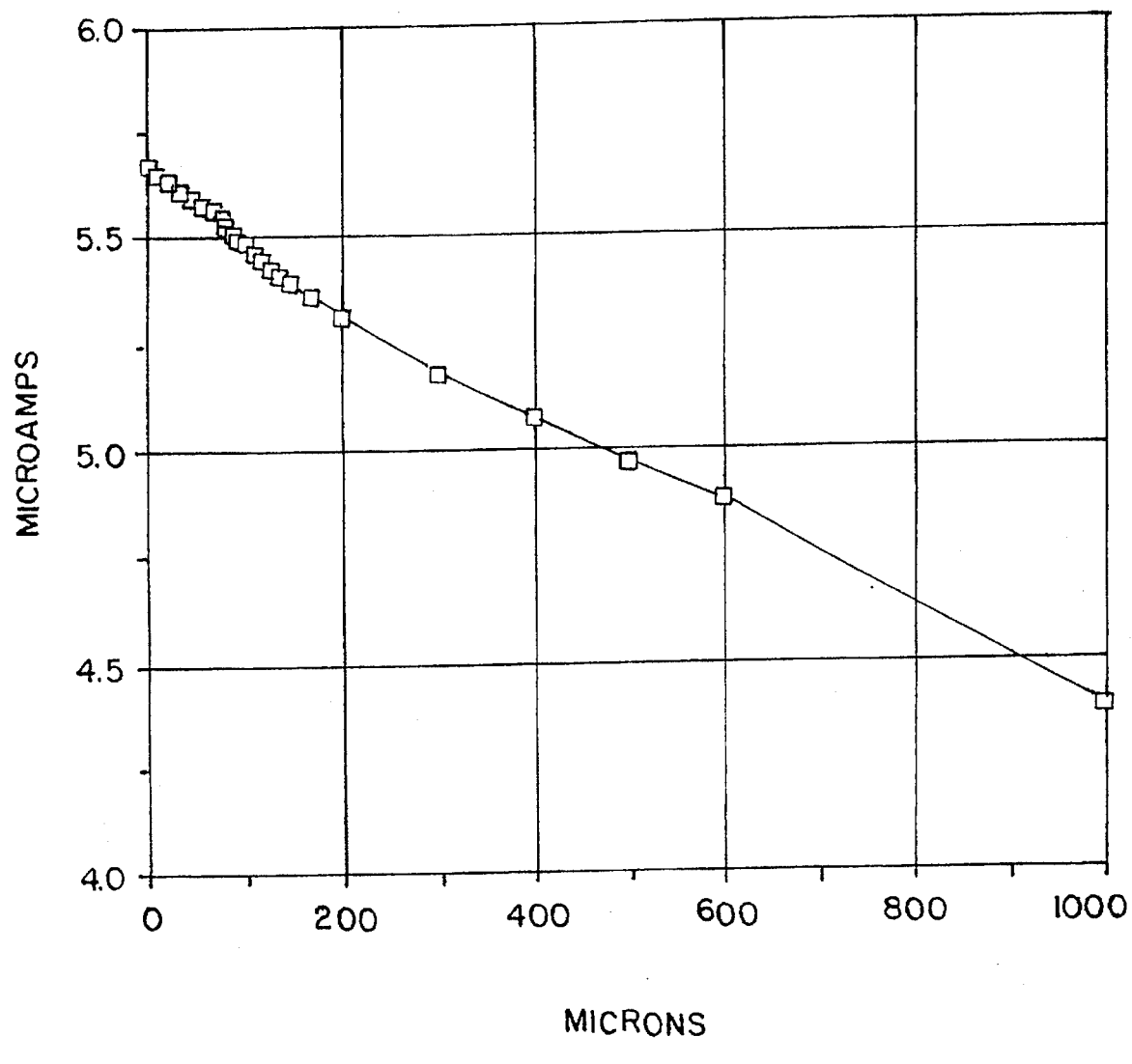
FIG. 3 illustrates a graph of the current versus pressure using the present invention.

The pirani pressure gauge operates when a fixed voltage is applied. The current passes through the current supply means (30) and into the sensor-heater bridge (50) and then to the current receiving means (40). The sensor-heater bridge will increase in temperature and ultimately stabilize at a given temperature. The heat being generated in the sensor-heater bridge is removed at a constant rate by gas molecules present in the surrounding environment. However, as the pressure is decreased, less gas molecules are available to remove the heat. Thus the sensor-heater bridge's temperature will increase leading to a decrease in resistance and an increase in current flow through the sensor-heater. Assuming the voltage remains constant, by monitoring the change in resistance, for example by monitoring the change in current flow, it is possible to determine the gas pressure. FIG. 3 shows the results of an ion implanted polymer bridge, biased with about 35 volts, and placed in a vacuum chamber which was then evacuated. The current depicted on the vertical axis is the current flowing through the heater-sensor bridge at the pressure given along the horizontal axis. A comparison of the present invention to the Weng and Shie gauge further articulates the advantages of the present gauge. The Weng and Shie gauge has a typical resistance of 450 ohms and a temperature coefficient of resistance of 0.25%/° C. The present invention has a typical resistance of 1 to 20 Mohms (no lead resistance compensation is necessary) and a TCR of 2%/° C. Because the resistance of the prior art pirani gauges is typically in the ohms or tens of ohms, multiple wire (e.g. Wheatstone Bridge) type measurements are absolutely necessary, typically utilizing a "dummy" gauge wire. The current invention can use an identical, unbiased resistor next to the sensing element in the gauge for temperature compensation.

A particular advantage in the current invention is that the TCR of the sensor-heater bridge is negative. When biased with a constant voltage (e.g. 30 volts) the resistor (bridge) heats up resulting in a decrease in resistance. This decreasing resistance allows more current to flow through it which increases the power being dissipated resulting in even more heating and further decreases in resistance. This process is a positive feedback loop and would quickly overheat and destroy the resistor element if the additional thermal energy is not dissipated in some way. For the pirani gauges, the bridge dissipates the energy in three modes: (1) thermal conduction to the substrate, (2) radiation, (3) conduction to the atmosphere. It is mode (3) which results in the pirani effect and freestanding bridges or wires are necessary to reduce mode (1) transfers by reducing the contact with the substrate and to increase mode (3) transfers. The rate at which heat is transferred by all three modes is proportional to the temperature difference between the sensor bridge and its surroundings. Thus, as the positive feedback loop described above is continually heating the bridge, the heat transfer rate also increases to the point that some set of voltage, current, pressure, and temperature results in a steady state condition. A change in any one of the conditions results in a new steady state. Since the sensor is biased with a constant voltage and either the ambient temperature does not change or is compensated for, a change in pressure results in a change in current. More specifically, as the pressure decreases, the thermal loss rate (mode 3) decreases in effectiveness which results in an increase in the sensor temperature or, because of the negative TCR, a decrease in resistance. This is the a major advantage of the present invention as indicated above. The negative TCR allows more current to flow through the resistor which heats it even more. This results in a two-fold increase in current flow making the present invention even more sensitive.

Because the sensor-heater bridge is a polymer, it is insensitive to material used in a corrosive or otherwise harmful atmosphere. Most prior art pirani gauges cannot be used in vacuums of corrosive gases.

To manufacture the present invention, conventional photolithographic techniques may be utilized. The manufacture of the present invention includes steps common in the semiconductor industry. The electrical interconnects (the current supply means and the current return means) are deposited on a silicon wafer substrate on which a 2 micron thick silicon oxide has been grown. The interconnects or pathways are then patterned by photolithography. A polymer film is deposited by spin coating or other techniques, such as roller coating or meniscus coating, which can be used to form a high quality thin film. The film is then implanted with energetic ions to a fluence of preferably $5 \times^{16}$ ions/cm$^2$. The heater-sensor bridge is patterned by coating with photoresist and imaging the resist to form an etch mask. The implanted polymer film is removed, where not protected by the photoresist mask, by reactive ion etching. The photoresist may then be removed by an appropriate solvent. The heater-sensor bridge is then released from the substrate to form a free standing bridge by dissolving the silicon oxide in hydrofluoric acid. Since the elements are much smaller than the interconnects or pathways, they are released before significant undercutting of the interconnects or pathways occurs. Albeit this is the preferred method of forming the sensor, it is not the only method available to those skilled in the art and a variety of methods may be used to form the heater-sensor bridge utilizing a variety of substrates and pathways. This method can be compared to the more complex pirani gauge manufacture described by Weng and Shie. The process involves at least four or five masking steps while the present invention requires only two. Furthermore platinum is expensive, polymers are inexpensive.

It will be obvious to those skilled in the art that various changes may be made without departing from the scope of the invention and the invention is not to be considered limited to what is illustrated in the drawings and described in the specification.

What is claimed is:

1. A pirani pressure sensor comprising:
   (a) an electrically non-conductive substrate;
   (b) means for supplying an electric current affixed to the substrate;
   (c) means for receiving an electric current affixed to the substrate and electrically isolated from the supply means; and
   (d) an electrically conductive polymer sensor-heater bridge with a first end electrically connected to said supply means and a second end electrically connected to said receiving means, while avoiding contact with the substrate, said bridge is an ion-implanted polymer wherein the sensor can measure pressure between $10^5$ to 760 TORR.

2. The pirani pressure sensor described in claim 1, wherein the means for receiving and means for supplying are a conductive material selected from the group of gold, metals, highly conductive polymers and highly doped semiconductors.

3. The pirani pressure sensor described in claim 2, wherein the substrate is a non-conductive material selected from the group of glass, aluminum oxide, quartz, polymers and insulated conductive substrates.

* * * * *